Patented Jan. 14, 1936

2,028,065

UNITED STATES PATENT OFFICE 2,028,065

SIMULTANEOUS HYDROLYSIS AND AMMONOLYSIS OF ARYL HALIDES

William J. Hale, Midland, Mich., assignor to The Dow Chemical Company, Midland, Mich., a corporation of Michigan No Drawing. Application November 18, 1933, Serial No. 698,588

12 Claims. (Cl. 260—128)

This invention concerns a method of simultaneously hydrolyzing and ammonolyzing an aryl halide, and particularly concerns the production of a phenol conjointly with the ammonolysis of a halobenzene.

It is well known that a halobenzene can be hydrolyzed under pressure at high temperature with a strong base, e. g. aqueous sodium hydroxide, to produce a phenol in good yield. Such hydrolysis, in the case of chlorobenzene, is carried out at temperatures above 250° C., usually above 320° C., since at lower temperatures the reaction is extremely sluggish, even when a catalyst such as copper or cuprous oxide is employed.

It is also known that a monohalobenzene can be reacted with aqueous ammonia in the presence of a cuprous compound, e. g. cuprous chloride, to produce aniline in high yield. The ammonolysis of such halobenzene can usually be carried out satisfactorily at a considerably lower temperature than the hydrolysis of the same halobenzene. For instance, the ammonolysis of chlorobenzene is usually carried out at between 150° and 250° C.

During ammonolysis of a halobenzene by usual methods very little hydrolysis occurs. For instance, when chlorobenzene is reacted with aqueous ammonia in the presence of a cuprous compound, the yield of phenol seldom exceeds 5 per cent of theoretical, based on the quantity of chlorobenzene reacted.

I have now found that by reacting an aryl halide with a mixture of:
 (1) Aqueous ammonia,
 (2) An alkali or alkaline earth metal hydroxide or carbonate, and
 (3) A cuprous, silver, cobaltic, or zinc compound an aryl amine and a corresponding phenolic compound can be produced simultaneously, each in good yield, even when the reaction is carried out at a temperature considerably below that necessary to hydrolyze said aryl halide rapidly by usual methods.

This rapid and unexpected formation of a phenolic product is due to the cuprous, silver, cobaltic, or zinc compound employed being converted into a corresponding metal-ammonio hydroxide, e. g. cuprous-ammonio hydroxide, by reaction with the ammonia and alkali or alkaline-earth metal base used. The metal-ammonio hydroxide furnishes the highly reactive hydroxyl and amine or ammonia groups necessary for the simultaneous formation of an aryl amine and a phenolic product by my method.

I have further found that the relative quantities of aryl amine and phenolic compounds produced by my method can be controlled by regulating the strength and concentration of the alkali or alkaline earth metal base used. For instance, when a relatively concentrated, e. g. 20 per cent, solution of a strong base, e. g. sodium or potassium hydroxide, is used, the phenolic product is obtained in high yield. When such strong base is employed in dilute solution, e. g. a 5 per cent solution, the yield of phenolic product is somewhat lower. When a very mild base, e. g. calcium carbonate, is used, the yield of phenolic product is relatively low.

The alkali or alkaline earth metal base which I employ not only serves as a reactant for the production of a phenolic compound, but also a portion of said base reacts with ammonium halide, which is formed as a by-product of the ammonolysis reaction, to regenerate ammonia, thereby permitting the use of a smaller proportion of ammonia in my process than is ordinarily required in ammonolysis reactions.

I have still further discovered that I can produce either a monoaryl amine or a diaryl amine by my method, according to the temperature at which the reaction is carried out. For instance, when chlorobenzene is simultaneously hydrolyzed and ammonolyzed at a temperature below 260° C., phenol and aniline are the principal products. When the reaction is carried out above 260° C., phenol and diphenyl amine are the principal products. The critical temperature below which the principal aryl amine product will be a monoaryl amine and above which it will be a diaryl amine is, of course, dependent both upon the reactivity of the aryl halide employed and upon the stability of the monoaryl amine corresponding to said aryl halide. However, when aryl chlorides are reacted by my method, such critical temperature usually is approximately 260° C.

My invention, then, distinguishes from, and is advantageous over, the hereinbefore mentioned usual methods for the hydrolysis or ammonolysis of an aryl halide in that by my method:—
 (1) An aryl halide can simultaneously be hydrolyzed and ammonolyzed to produce both a phenolic compound and an aryl amine in good yield,
 (2) The relative quantities of phenolic and aryl amine compounds produced can be controlled,
 (3) An aryl halide can be hydrolyzed more rapidly and at lower temperatures than is possible by other hydrolysis methods, and
 (4) Ammonia is regenerated continuously from by-product ammonium halide, so that little, if any, ammonia is lost through by-product formation and a large excess of ammonia need not be used, i. e. an amount of ammonia appreciably in excess of that theoretically required to convert the aryl halide to the corresponding amine need not be, and preferably is not, employed.

To the accomplishment of the foregoing and related ends, the invention consists of the method hereinafter fully described and particularly pointed out in the claims, the following description and examples setting forth in detail only several of the various ways in which the principle of the invention may be employed.

The following description illustrates my method as applied to the simultaneous production of phenol and a phenyl amine from chlorobenzene.

Chlorobenzene is mixed with:—
(1) At least 0.1 its molecular equivalent of ammonia in aqueous solution,
(2) At least 0.5 its chemical equivalent of an alkali or alkaline earth metal base, e. g. sodium hydroxide, potassium hydroxide, calcium hydroxide, barium hydroxide, magnesium hydroxide, or a corresponding carbonate,
(3) At least 0.2 its chemical equivalent of a cuprous compound, e. g. cuprous oxide, chloride, bromide, etc., and
(4) Water in amount representing at least, and preferably more than, twice the weight of said alkali or alkaline earth metal base.

The mixture is heated under pressure, preferably with agitation, at a temperature above 150° C. If phenol and aniline are the desired products, the mixture is heated at between about 150° and 260° C., preferably between 200° and 240° C. If phenol and diphenyl amine are the desired products, the mixture is heated at a temperature above 260° C., but below that at which the reaction products are decomposed, preferably at between 290° and 350° C. The reaction is usually complete after about 2 hours of heating, but longer heating is sometimes required, particularly at the lower reaction temperatures.

During the above described reaction a small quantity of diphenyl oxide is usually formed as a by-product. Such formation of diphenyl oxide can, I have found, be avoided by adding diphenyl oxide to the initial reaction mixture in amount equivalent to that usually formed in the reaction.

The phenol, aniline, diphenyl amine, and diphenyl oxide products are separated by usual procedure. For instance, aniline can be fractionally steam distilled directly from the alkaline reacted mixture. The residual liquor can be acidified with a strong acid, e. g. hydrochloric or sulphuric acid, and phenol can then be steam distilled therefrom. The remaining liquid can be made basic and thereafter can be extracted with a water-immiscible organic solvent, e. g. gasoline, benzene, toluene, etc., to obtain a solution of the diphenyl amine and diphenyl oxide in said organic solvent. The last mentioned solution is dried and treated with a strong mineral acid, preferably hydrogen chloride, to precipitate the diphenyl amine as a salt thereof. The diphenyl amine salt is separated by filtration and the filtrate is fractionally distilled to separate the diphenyl oxide.

Other methods of separating such products will be apparent to those skilled in the art.

The reaction temperatures mentioned above are those which should be employed in reacting chlorobenzene by my method. Approximately the same temperatures can be employed successfully in reacting other aryl chlorides. Aryl bromides, however, can be reacted at lower temperatures than can the corresponding aryl chlorides, and aryl iodides can be reacted at still lower temperatures. In fact, some aryl halides, e. g. iodobenzene, can be reacted at temperatures attainable at atmospheric pressure. The temperature at which an aryl halide reacts with the bases employed can, in any given instance, be determined by withdrawing samples of the reaction mixture from time to time while heating said mixture, and analyzing the samples to determine whether inorganic halides are being formed. When formation of inorganic halide is observed, the desired reactions are occurring.

The proportions of ammonia, alkali or alkaline earth metal base, and cuprous compound stated in the above description are the minimum proportions that can successfully be used. In practice, I prefer to employ at least 0.3 mole of ammonia, at least 1 chemical equivalent of an alkali or alkaline earth metal base, and at least 0.3 chemical equivalent of a cuprous compound per chemical equivalent of aryl halide. In reacting certain aryl chlorides, e. g. 2-chloronaphthalene, at the lower reaction temperatures mentioned, e. g. 150°–220° C., it is sometimes necessary to employ considerably more than 0.2 chemical equivalent of cuprous compound per chemical equivalent of the aryl chloride in order to obtain rapid reaction.

The following examples describe several ways in which the principle of my invention has been applied, but are not to be construed as limiting the invention.

*Example 1.—Phenol and diphenyl amine*

33.7 grams (0.3 mole) of chlorobenzene, 7.8 grams (0.11 mole) of 24 per cent by weight aqueous ammonia, 160 grams (0.4 mole) of 10 per cent aqueous sodium hydroxide, and 10 grams (0.07 mole) of cuprous oxide were mixed and heated in a rotating iron bomb at 225° C. for 2 hours and then at 300° C. for an additional 2 hours. The bomb was then cooled and the charge removed therefrom. In order to make certain that the entire charge had been removed from the bomb, the latter was washed with sufficient hydrochloric acid to dissolve any residual copper compounds and the washings were added to the reaction liquor. The latter was then neutralized with sodium hydroxide, whereby two layers were formed, i. e. an upper aqueous layer having the copper compounds and sodium chloride dissolved therein and a bottom oily layer. The oily layer was separated and then extracted with approximately 250 grams of 20 per cent aqueous sodium hydroxide to remove phenol therefrom. The extract was acidified, extracted with ether, and the ether extract was fractionally distilled, whereby 16.2 grams (.173 mole) of phenol was obtained. The oily material remaining after the above mentioned extraction with sodium hydroxide solution was acidified with hydrochloric acid, then neutralized with sodium carbonate and extracted with ether. The ether extract was fractionally distilled to obtain 0.3 gram (0.003 mole) of aniline. The oil remaining after the above extractions was dissolved in benzene and the solution was treated with anhydrous hydrogen chloride to precipitate diphenyl amine hydrochloride. The latter was separated by filtration and acidified to obtain 6.6 grams (0.039 mole) of diphenyl amine. Benzene was evaporated from the filtrate to obtain as a residue 2.1 grams (0.013 mole) of diphenyl oxide. The per cent of theoretical yields of the above respective products, based on the quantity of chlorobenzene used, were:—phenol, 57.5%; aniline, 1.1%; diphenyl amine, 26%; and diphenyl oxide, 4.2%.

*Example 2.—Phenol and diphenyl amine*

33.7 grams (0.3 mole) of chlorobenzene, 7.8 grams (0.11 mole) of 24 per cent aqueous ammonia solution, 14.8 grams (0.2 mole) of calcium hydroxide, 10 grams (0.07 mole) of cuprous oxide, and 144 grams of water were mixed and treated in accordance with the procedure described in Example 1. Prior to separating the products, as in Example 1, a 2 cubic centimeter portion of the alkaline reacted liquor was analyzed for inorganic chlorides, it being found thereby that only 31 grams (0.276 mole) of chlorobenzene was consumed in the reaction. The unreacted chlorobenzene was recovered in the diphenyl oxide fraction of the products and was separated from said diphenyl oxide by fractional distillation. The per cent of theoretical yields of the several products, based on the quantity of chlorobenzene reacted, were:—phenol, 22.7%; aniline, trace; diphenyl amine, 58.6%; and diphenyl oxide, 10.7%.

*Example 3.—Phenol and diphenyl amine*

33.7 grams (0.3 mole) of chlorobenzene, 7.8 grams (0.11 mole) of 24 per cent aqueous ammonia solution, 20 grams (0.2 mole) of finely divided calcium carbonate, 10 grams (0.07 mole) of cuprous oxide, and 144 grams of water were mixed and treated as in Example 1. Prior to separating the reaction products, a 2 cubic centimeter portion of the alkaline reacted liquor was analyzed for inorganic chlorides, it being found thereby that 0.273 mole or 91 per cent of the chlorobenzene used was reacted. The per cent of theoretical yields of the reaction products, based on the quantity of chlorobenzene reacted, were:—phenol, 19.9%; aniline, trace; diphenyl amine, 65.5%; and diphenyl oxide, 10.4%.

*Example 4.—Phenol and diphenyl amine*

The run described in Example 3 was repeated, except that 2.4 grams (0.0143 mole) of diphenyl oxide were added to the initial reaction mixture. It was found that the formation of diphenyl oxide in the reaction was completely prevented and that the yields of phenol and diphenyl amine were increased. The per cent of theoretical yields of the reaction products, based on the quantity of chlorobenzene reacted, were approximately:—phenol, 23.8%; aniline, trace; and diphenyl amine, 69.7%.

*Example 5.—Phenol and aniline*

33.7 grams (0.3 mole) of chlorobenzene, 7.8 grams (0.11 mole) of 24 per cent aqueous ammonia, 20 grams (0.2 mole) of finely divided calcium carbonate, 10 grams (0.07 mole) of cuprous oxide, and 144 grams of water were mixed and heated to 225°–235° C. in a rotating iron bomb for 4 hours. The bomb was then cooled and the charge removed. A 2 cubic centimeter portion of the reacted liquor was analyzed for inorganic chlorides, it being found thereby that 0.255 mole or 85 per cent of the chlorobenzene used was reacted. The reaction products were separated from the main body of reaction liquor by procedure similar to that described in Example 1. The per cent of theoretical yields of the several products, based on the quantity of chlorobenzene reacted, were:—phenol, 26.7%; aniline, 56%; diphenyl amine, 4%; and diphenyl oxide, 4%.

*Example 6.—Cresol and ditolyl amine*

38 grams (0.3 mole) of 2-chloro-toluene, 7.8 grams (0.11 mole) of 24 per cent aqueous ammonia, 14.8 grams (0.2 mole) of calcium hydroxide, 5 grams (0.035 mole) of cuprous oxide, and 144 grams of water were mixed and heated in a rotating iron bomb, first at 225° C. for 2 hours and then at 300° C. for an additional 2 hours. The bomb was then cooled, the charge removed, and the products separated by procedure similar to that described in Example 1. There was obtained 10.2 grams or a 33.4 per cent yield of cresol, only a trace (about 0.4 gram) of toluidine, 17.2 grams or a 56.4 per cent yield of 2,2'-ditolyl amine, and 2.4 grams or a 7.8 per cent yield of ditolyl oxide, each of said yields being the per cent of theoretical yield based on the quantity of 2-chloro-toluene reacted.

Example 1 shows that when chlorobenzene is simultaneously hydrolyzed and ammonolyzed in the presence of a strong base, e. g. sodium hydroxide, the yield of phenol is high and the yield of the phenyl amine product is relatively low. Example 1 shows further that if, during the reaction, the mixture is heated to a temperature considerably higher than 260° C., the phenyl amine product is principally diphenyl amine.

Example 2 shows that by employing a relatively mild base, e. g. calcium hydroxide, instead of sodium hydroxide as in Example 1, the yield of phenol is lowered while the yield of diphenyl amine is increased. Example 3 shows that when the reaction is carried out in the presence of a still weaker base, e. g. calcium carbonate, the yield of phenol is still lower and the yield of diphenyl amine is increased further.

Example 4 shows that the formation of a diaryl oxide by-product, e. g. diphenyl oxide, can be prevented by adding said diaryl oxide to the mixture prior to carrying out the reaction.

Example 5 shows that when chlorobenzene is reacted by my method at a temperature considerably lower than 260° C., aniline is the principal phenyl amine product.

Example 6 illustrates the fact that other aryl chlorides, e. g. chloro-toluene, can be reacted to form simultaneously phenolic and aryl amine products, e. g. cresol and ditolyl amine, under substantially the same conditions as are required to form the corresponding products, e. g. phenol and diphenyl amine, from chlorobenzene.

Other aryl halides, e. g. bromobenzene, chloronaphthalene, chloro-diphenyl, bromo-phenol, ethyl-chlorobenzene, nitro-chlorobenzene, etc., can simultaneously be hydrolyzed and ammonolyzed by my method to form corresponding phenolic and aryl amine products. Insofar as I am aware, any aryl halide can be employed successfully as a reactant.

Instead of using a cuprous compound in my reaction, I may employ a silver, cobaltic, or zinc compound, e. g. silver oxide, cobaltic nitrate, zinc chloride, etc. The reaction occurs most rapidly and smoothly, however, when a cuprous compound is used.

It will be understood, of course, that instead of adding a cuprous compound to a reaction mixture, a cupric compound, e. g. copper sulphate, can be added and the cuprous compound can thereafter be formed within said reaction mixture by reduction of the cupric compound with copper, iron, or other reducing agent.

Other modes of applying the principle of my invention may be employed instead of those explained, change being made as regards the method herein disclosed, provided that the step or steps stated by any of the following claims or the equivalent of such stated step or steps be employed.

I therefore particularly point out and distinctly claim as my invention:—

1. In a method of simultaneously hydrolyzing and ammonolyzing an aryl halide, the step which consists in heating said aryl halide with:—at least 0.1 its chemical equivalent of ammonia, at least 0.2 its chemical equivalent of a compound selected from the class consisting of cuprous, silver, cobaltic, and zinc compounds, at least 0.5 its chemical equivalent of a base selected from the class consisting of alkali and alkaline earth metal bases, and water in amount representing at least twice the weight of said base, to a temperature at which the aryl halide reacts with the bases present.

2. In a method of simultaneously hydrolyzing and ammonolyzing an aryle halide, the step which consists in heating said aryl halide with:—at least 0.3 its chemical equivalent of ammonia, at least 0.2 its chemical equivalent of a compound selected from the class consisting of cuprous, silver, cobaltic, and zinc compounds, at least its chemical equivalent of a base selected from the class consisting of alkali and alkaline earth metal bases, and water in amount representing at least twice the weight of said base, to a temperature at which the aryl halide reacts with the bases present.

3. In a method of simultaneously hydrolyzing and ammonolyzing an aryl halide, the steps which consist in mixing said aryl halide with:—at least 0.3 its chemical equivalent of ammonia, at least 0.3 its chemical equivalent of a cuprous compound, at least its chemical equivalent of a base selected from the class consisting of alkali and alkaline earth metal bases, and water in amount representing at least twice the weight of said base, heating the mixture to a temperature at which the aryl halide reacts with the bases present, and thereafter separating the phenolic and aryl amine products from the reacted mixture.

4. In a method of simultaneously hydrolyzing and ammonolyzing an aryl chloride, the step which consists in heating, at superatmospheric pressure to a reaction temperature above 150° C. but below that at which the reaction products are substantially decomposed, said aryl chloride with:—at least 0.1 its chemical equivalent of ammonia, at least 0.2 its chemical equivalent of a cuprous compound, at least 0.5 its chemical equivalent of a base selected from the class consisting of alkali or alkaline earth metal bases, and water in amount representing at least twice the weight of said base.

5. In a method of simultaneously hydrolyzing and ammonolyzing an aryl chloride, the steps which consist in heating, at superatmospheric pressure to a reaction temperature above 150° C. but below that at which the reaction products are substantially decomposed, said aryl chloride with:—at least 0.3 its chemical equivalent of ammonia, at least 0.3 its chemical equivalent of a cuprous compound, at least its chemical equivalent of a base selected from the class consisting of alkali and alkaline earth metal bases, and water in amount representing at least twice the weight of said base, and thereafter separating the phenolic and aryl amine products from the reacted mixture.

6. In a method of making a phenolic compound and a corresponding monoaryl amine simultaneously, the step which consists in heating, at superatmospheric pressure to a reaction temperature between about 150° and about 260° C., an aryl chloride with:— at least 0.3 its chemical equivalent of ammonia, at least 0.2 its chemical equivalent of a cuprous compound, at least its chemical equivalent of a base selected from the class consisting of alkali and alkaline earth metal bases, and water in amount representing at least twice the weight of said base.

7. In a method of making a phenolic compound and a corresponding diaryl amine simultaneously, the step which consists in heating, at superatmospheric pressure to a temperature above about 260° C. but below that at which the reaction products are substantially decomposed, an aryl chloride with:— at least 0.3 its chemical equivalent of ammonia, at least 0.3 its chemical equivalent of a cuprous compound, at least its chemical equivalent of a base selected from the class consisting of alkali and alkaline earth metal bases, and water in amount representing at least twice the weight of said base.

8. In a method of making phenol and a phenyl amine simultaneously, the step which consists in heating a monohalo-benzene with:— at least 0.1 its chemical equivalent of ammonia, at least 0.2 its chemical equivalent of a cuprous compound, at least 0.5 its chemical equivalent of a base selected from the class consisting of alkali and alkaline earth metal bases, and water in amount representing at least twice the weight of said base, to a temperature at which the monohalobenzene reacts with the bases present.

9. In a method of making phenol and a phenyl amine simultaneously, the step which consists in heating, at superatmospheric pressure to a reaction temperature above 150° C. but below that at which the reaction products are substantially decomposed, chlorobenzene with:— at least 0.1 its chemical equivalent of ammonia, at least 0.2 its chemical equivalent of a cuprous compound, at least 0.5 its chemical equivalent of a base selected from the class consisting of alkali and alkaline earth metal bases, and water in amount representing at least twice the weight of said base.

10. In a method of making phenol and aniline simultaneously, the step which consists in heating, at superatmospheric pressure to a reaction temperature between about 150° and about 260° C., chlorobenzene with:— at least 0.3 its chemical equivalent of ammonia, at least 0.2 its chemical equivalent of a cuprous compound, at least its chemical equivalent of a base selected from the class consisting of alkali and alkaline earth metal bases, and water in amount representing at least twice the weight of said base.

11. In a method of making phenol and diphenyl amine simultaneously, the step which consists in heating, at superatmospheric pressure to a temperature above about 260° C. but below that at which the reaction products are substantially decomposed, chlorobenzene with:— at least 0.3 its chemical equivalent of ammonia, at least 0.2 its chemical equivalent of a cuprous compound, at least its chemical equivalent of a base selected from the class consisting of alkali and alkaline earth metal bases, and water in amount representing at least twice the weight of said base.

12. In a method of making cresol and ditolyl amine simultaneously, the step which consists in heating, at superatmospheric pressure to a temperature above about 260° C. but below that at which the reaction products are substantially decomposed, chlorotoluene with:— at least 0.3 its chemical equivalent of ammonia, at least 0.2 its chemical equivalent of a cuprous compound, at least its chemical equivalent of a base selected from the class consisting of alkali and alkaline earth metal bases, and water in amount representing at least twice the weight of said base.

WILLIAM J. HALE.